No. 679,853. Patented Aug. 6, 1901.
M. W. MARSDEN.
MACHINE FOR MAKING BRICKS.
(Application filed Mar. 19, 1900.)
(No Model.) 4 Sheets—Sheet 1.
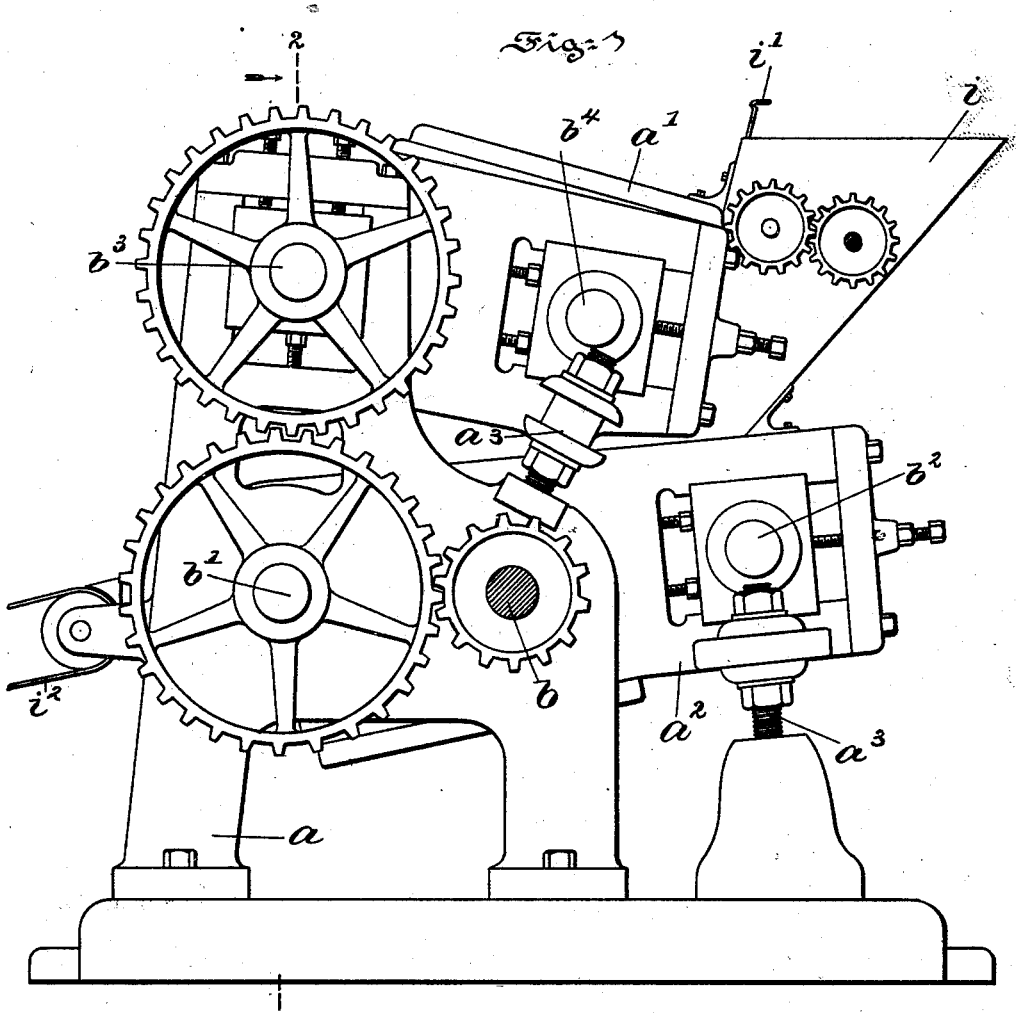
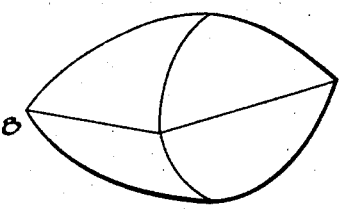

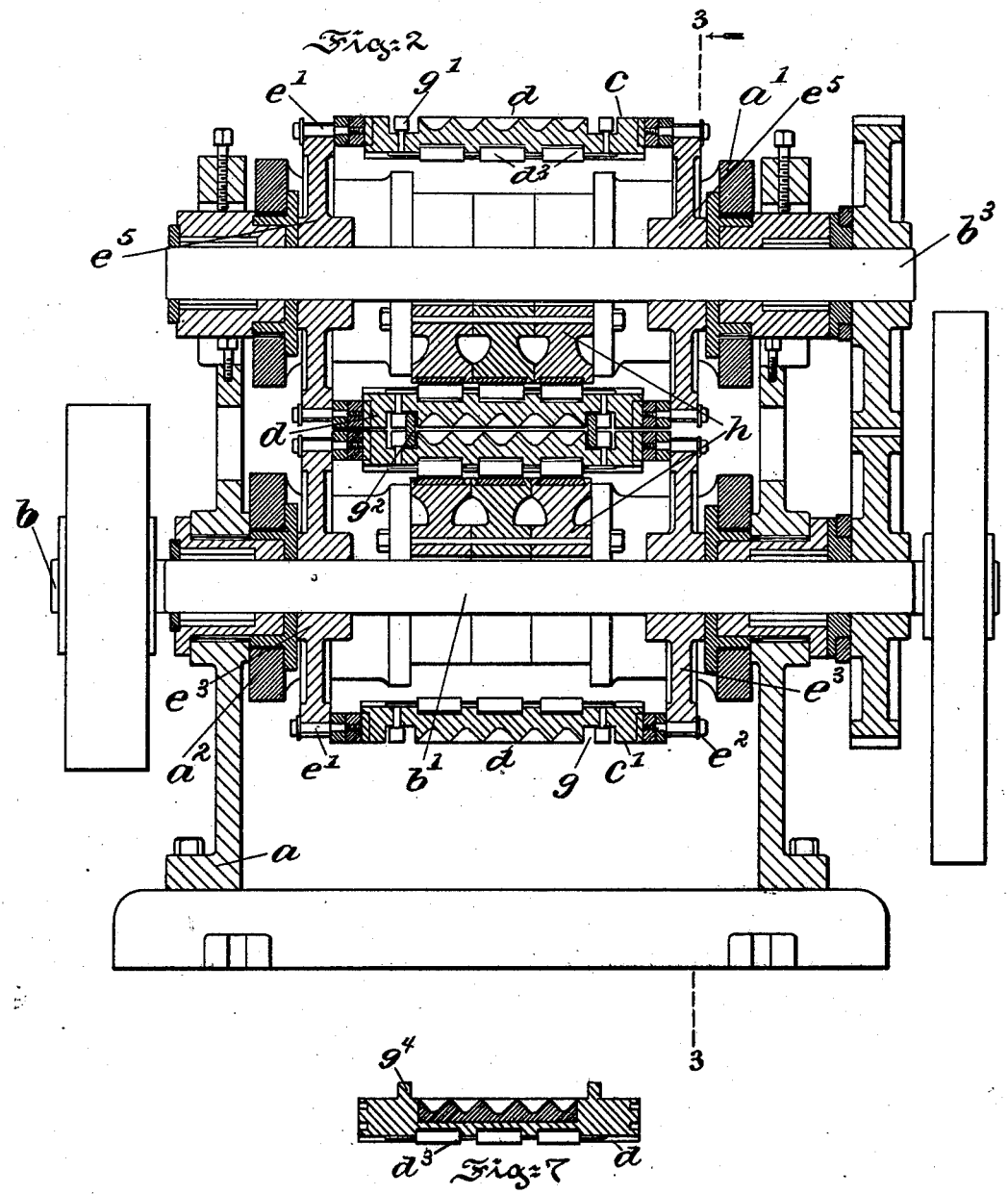

No. 679,853.  
Patented Aug. 6, 1901.
M. W. MARSDEN.
MACHINE FOR MAKING BRICKS.
(Application filed Mar. 19, 1900.)
(No Model.)  
4 Sheets—Sheet 3.
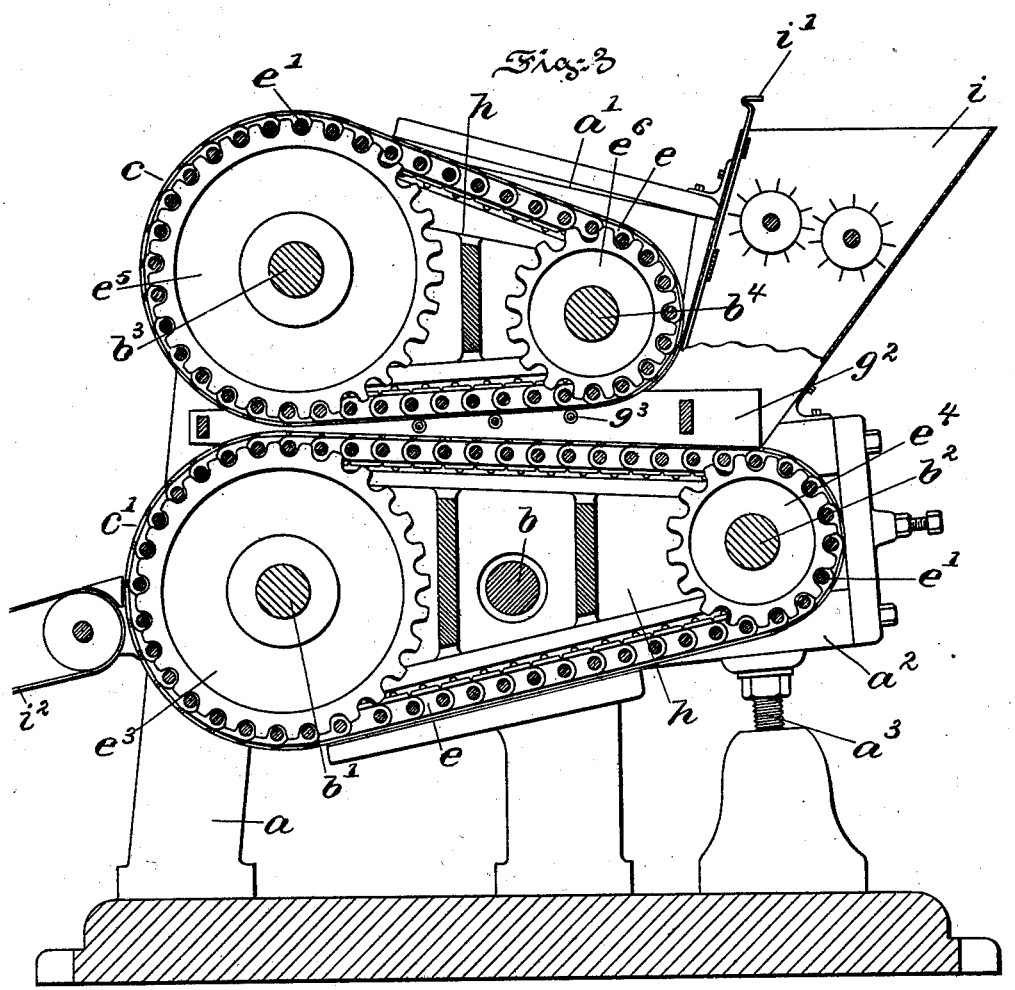

No. 679,853. Patented Aug. 6, 1901.
M. W. MARSDEN.
MACHINE FOR MAKING BRICKS.
(Application filed Mar. 19, 1900.)
(No Model.) 4 Sheets—Sheet 4.
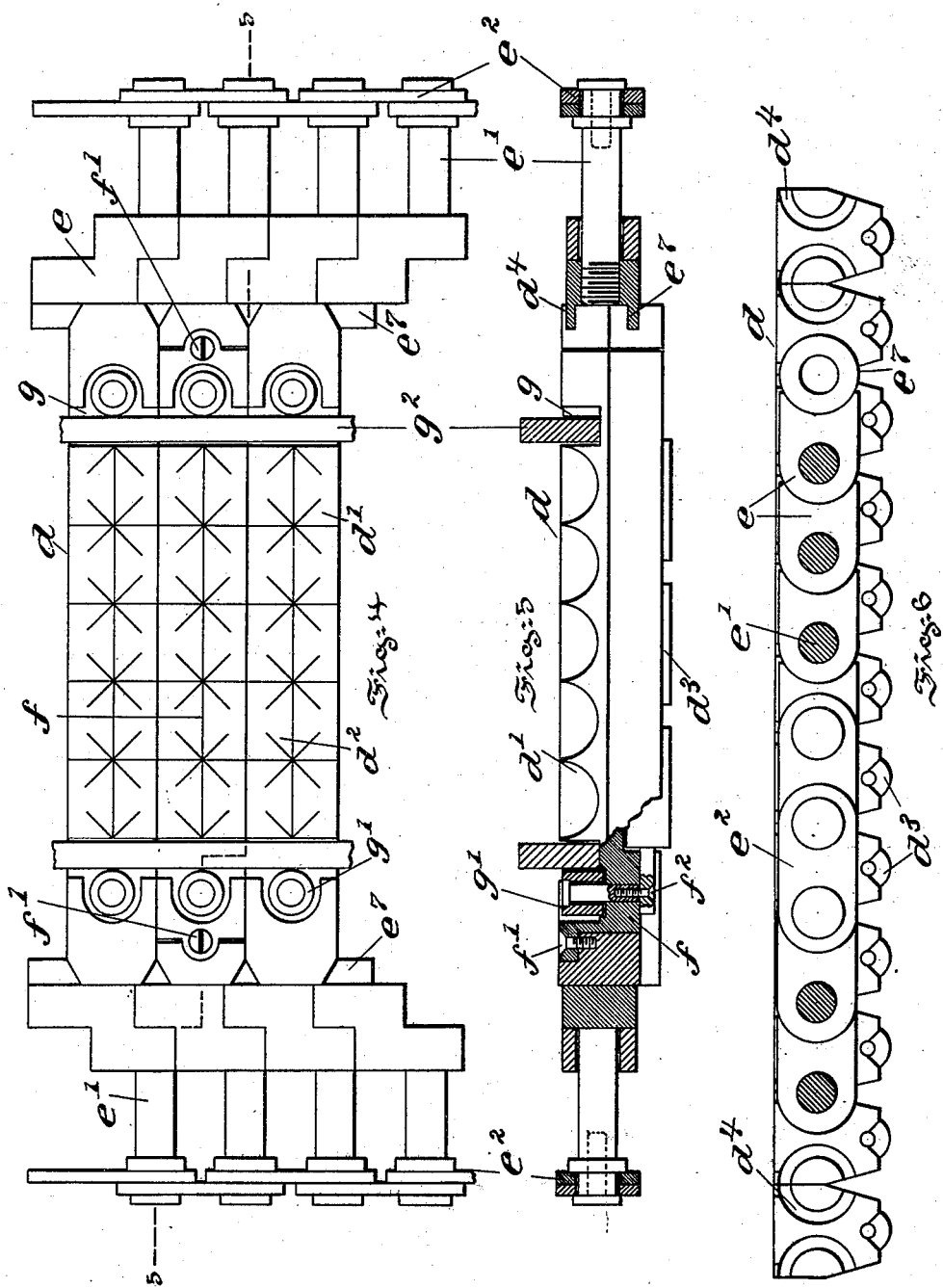

UNITED STATES PATENT OFFICE.

MARK W. MARSDEN, OF PHILADELPHIA, PENNSYLVANIA.

MACHINE FOR MAKING BRICKS.

SPECIFICATION forming part of Letters Patent No. 679,853, dated August 6, 1901.

Application filed March 19, 1900. Serial No. 9,139. (No model.)

*To all whom it may concern:*

Be it known that I, MARK W. MARSDEN, a citizen of the United States, residing at Philadelphia, in the county of Philadelphia and State of Pennsylvania, have invented a certain new and useful Machine for Making Bricks, Briquets, and the Like, of which the following is a specification.

The object of the invention is to provide a comparatively light-running machine of simple, durable, and reliable construction, and which will rapidly, efficiently, and automatically consolidate loose or plastic material into compact forms, bricks, briquets, and the like and deliver the same for use or subsequent treatment, as the case may be.

Stated in general terms, the invention comprises a pair of driven endless aprons composed of normally closed, separable, or jointed dies or molds, and means for guiding them at an inclination toward each other to consolidate and shape the material and away from each other to open the molds or dies and discharge the molded material.

The nature, characteristic features, and scope of the invention will be more fully understood from the following description, taken in connection with the accompanying drawings, forming part hereof, and in which—

Figure 1 is a side elevational view of a machine embodying features of the invention with the driving-wheel removed for the sake of clearness. Fig. 2 is a view in cross-section, taken on the line 2 2 of Fig. 1, looking in the direction of the arrow. Fig. 3 is a sectional view, taken on the line 3 3 of Fig. 2, looking in the direction of the arrow. Fig. 4 is a plan view, drawn to an enlarged scale and illustrating a portion of the apron and showing the separable dies or molds. Fig. 5 is a sectional view taken on the line 5 5 of Fig. 4. Fig. 6 is a side elevational view, partly in section, of a portion of the apron. Fig. 7 is a slightly-modified form of the dies or molds in which they are detachable from the apron proper, and Fig. 8 is a perspective view of one form of briquet that can be produced by a machine of my invention.

Referring to the drawings, $a$ is a main frame provided with a driving-shaft $b$ and supporting accessory pivotal frames $a'$ and $a^2$, which are adapted to carry and constitute bearings for apron shafts and wheels adapted to revolve a pair of endless aprons $c$ and $c'$. As shown, these accessory frames are pivoted by means of hollow trunnions, Fig. 2, at one of their ends to the main frame, so that the inclination of the aprons can be adjusted in order to accommodate them to the amount of feed, as will be hereinafter described. The accessory frames are adjustable in respect to the main frame at one of their ends by means of adjustable bearing-blocks and at the other of their ends by means of suitable adjustments $a^3$. The apron-shafts are journaled in these accessory frames, and the accessory frames are provided with apron-supports $h$, so that when the material is being fed to the machine it presses the aprons against the apron-supports $h$, and there is practically no strain on the apron-shafts, since it is referred to the main frame. This pair of aprons coöperate and are constructed to operate as molds or dies when material is fed between them, and they form bricks, briquets, &c. As shown in the drawings, they are constructed to form a series of two-part pockets, dies, or molds, which are designed to form briquets; but the pockets, dies, or molds in the aprons may be otherwise formed in order to conform to the character of the work to be done, which may be the manufacture of continuous strips. However, the number of parts that make up each mold and the shape and size thereof are not material and are not the essential part of the invention. With reference now more particularly to Figs. 2, 4, 5, and 6 the aprons are composed of a series of detachable members $d$, which go to make up the dies or molds, each consisting of a series of quarter-pockets $d'$ and $d^2$. It will be apparent by reference to Fig. 4 that to complete one pocket, die, or mold it is necessary to have four quarter parts. Thus, in effect, there is a series of four-part dies or molds in the machine proper. This is an advantageous feature in that the loose material having been consolidated under great pressure has the tendency to cling to the mold, and this clinging tendency is obviated because the dies or molds open in four directions, thus insuring the free delivery of the briquets. These members $d$ may be provided with semicircular grooves $d^4$, adapted to receive circular flanges $e^7$ of knuckle-joints $e$, which in turn are connected with suitable pins $e'$ and links $e^2$, and thus make up chains. These chains engage the apron-wheels, as $e^3$, $e^4$, $e^5$, and $e^6$, mounted on the shafts $b'$, $b^2$, $b^3$, and $b^4$. These apron-wheels are rotated by the shaft $b$ through the intervention of suitable gearing, as shown. Interposed in the aprons at suitable places are members, as $f$, which differ from the rest of the members. This is necessary in order that the apron may be set up or taken apart. To accomplish this, the screws $f'$ and $f^2$ are provided. To uncouple the apron, these screws are removed, which permits of the member part $f$ itself being removed, so that the successive members, together with their knuckle-joints, pins, and links can be readily taken apart. Each member $d$ is provided with slots $g$ and rollers $g'$, adapted to accommodate a guide-piece $g^2$, held at each end of the machine in any preferred manner and adapted to confine the material to be fed to the molds or dies and to prevent spreading of the material to the other parts of the machine, and thus clogging and interfering with the working parts of the same. The rollers acting on the guides $g^2$ prevent undue friction and cause the parts to run smoothly. Attached to the lower portion of the dies or molds are a number of rolls $d^3$, adapted to run on the apron-supports $h$, which may form part of or be attached to the accessory frames $a'$ and $a^2$. This insures a support for the aprons when the material is fed between the same and receives the pressure exerted upon the aprons. In order to prevent undue sagging of the upper apron, small rollers, as $g^3$, are attached to the guide-pieces $g^2$, which hold the apron against the apron-support $h$.

At one end of the machine there is provided a hopper $i$, which may be provided with feed mechanism adapted to disintegrate solid pieces, and also an adjustable portion or gate $i'$, adapted to regulate the quantity of material to be fed between the aprons $c$ and $c'$. At the other end of the machine there may be provided a conveyer, as $i^2$, adapted to receive the finished briquets. As shown, there is an open-top hopper provided with feed-wheels. However, other types of hoppers and feed devices, as screw conveyers, may be employed.

The mode of operation of the apparatus shown in the drawings may be described as follows: The material to be acted upon is fed from the hopper by the feeding mechanism and regulated as to quantity by the adjustable portion or gate $i'$ between the aprons, and it is prevented from spreading beyond the aprons by the guide-pieces $g^2$. Power is transmitted from the main driving-shaft through the intervention of a series of gear-wheels to the apron-shafts and apron-wheels, which in turn revolve the aprons, and thus cause the material to be carried along and subjected to increasing pressure as it nears the front of the machine, where extreme pressure is brought to bear upon it just prior to its leaving the machine. The center of the shaft $b^3$ is slightly out of line with the center of the shaft $b'$ in order that the pockets, dies, or molds of the upper apron $c$ may open slightly in advance of those of the lower apron, thus preventing the material from clinging to the upper apron and insuring its positive delivery to the conveyer. This arrangement also facilitates the passage of the material between the wheels, and consequently effects a saving in power and strain on the machine. It is thus apparent that by reason of their shape, inclination, and disposition the dies or molds compress and form the material automatically, rapidly, efficiently, and compactly.

The modification shown in Fig. 7 differs slightly from the foregoing in that the upper parts of the members carrying the pockets, dies, or molds if worn may be removed and replaced without necessitating the taking apart of the whole apron, and it also differs in that the guide-pieces $g^4$ are formed with or attached to the apron and consist of a number of pieces corresponding in width to the members and adapted to revolve with the apron.

It will be obvious to those skilled in the art to which the invention relates that modifications may be made in details without departing from the spirit thereof. Hence I do not limit myself to the precise construction and arrangement of parts hereinabove set forth and illustrated in the drawings; but,

Having thus described the nature and objects of the invention, what I claim as new, and desire to secure by Letters Patent, is—

1. A machine of the class specified comprising a main frame, accessory frames pivoted to the main frame, a pair of aprons mounted in the accessory frames and having dies or molds and rollers, apron-supports to accommodate the rollers, and means for rotating the aprons, substantially as described.

2. A machine of the type recited comprising a main frame, accessory frames pivoted at one of their ends to the main frame by hollow trunnions, adjustable connections between the main frame and the other ends of the accessory frames, apron-shafts whereof two are mounted in said trunnions and two in said accessory frames, apron-supports carried by each accessory frame, and aprons cooperating with the apron-supports, substantially as described.

3. A machine of the class specified comprising a pair of driven endless aprons each made up of half dies or molds, means for guiding them at an inclination toward each other to consolidate and shape the material and away from each other to open the molds and discharge the molded material, apron-supports, and means for adjusting either apron in respect to the other, substantially as described.

4. In combination, a main frame, accessory frames pivoted to the main frame, a pair of aprons mounted in the accessory frames and having dies or molds and rollers, apron-supports to accommodate the rollers, means for rotating the aprons, means for feeding the raw material to the aprons, and a conveyer for the molded material, substantially as described.

5. In combination, a main frame, accessory frames pivoted to the main frame, a pair of aprons mounted in the accessory frames and having half dies or molds and rollers, apron-supports to accommodate the rollers, means for rotating the aprons, a feeding-hopper, means for regulating the feed therefrom, and a conveyer for the molded material.

6. In apparatus such as described, the pair of driven aprons superposed one above the other and each comprising half dies or molds and rollers, means for guiding said aprons at an inclination to each other, such that at their point of contiguity they form complete dies or molds, apron-supports to accommodate the rollers, a hopper adapted and arranged for automatically feeding the raw material to the space between the aprons, means for adjusting the aprons relatively to each other, and a conveyer to receive the molded material, substantially as described.

In testimony whereof I have hereunto signed my name.

MARK W. MARSDEN.

In presence of—
  W. J. JACKSON,
  FRANKLIN T. KALAS.